UNITED STATES PATENT OFFICE.

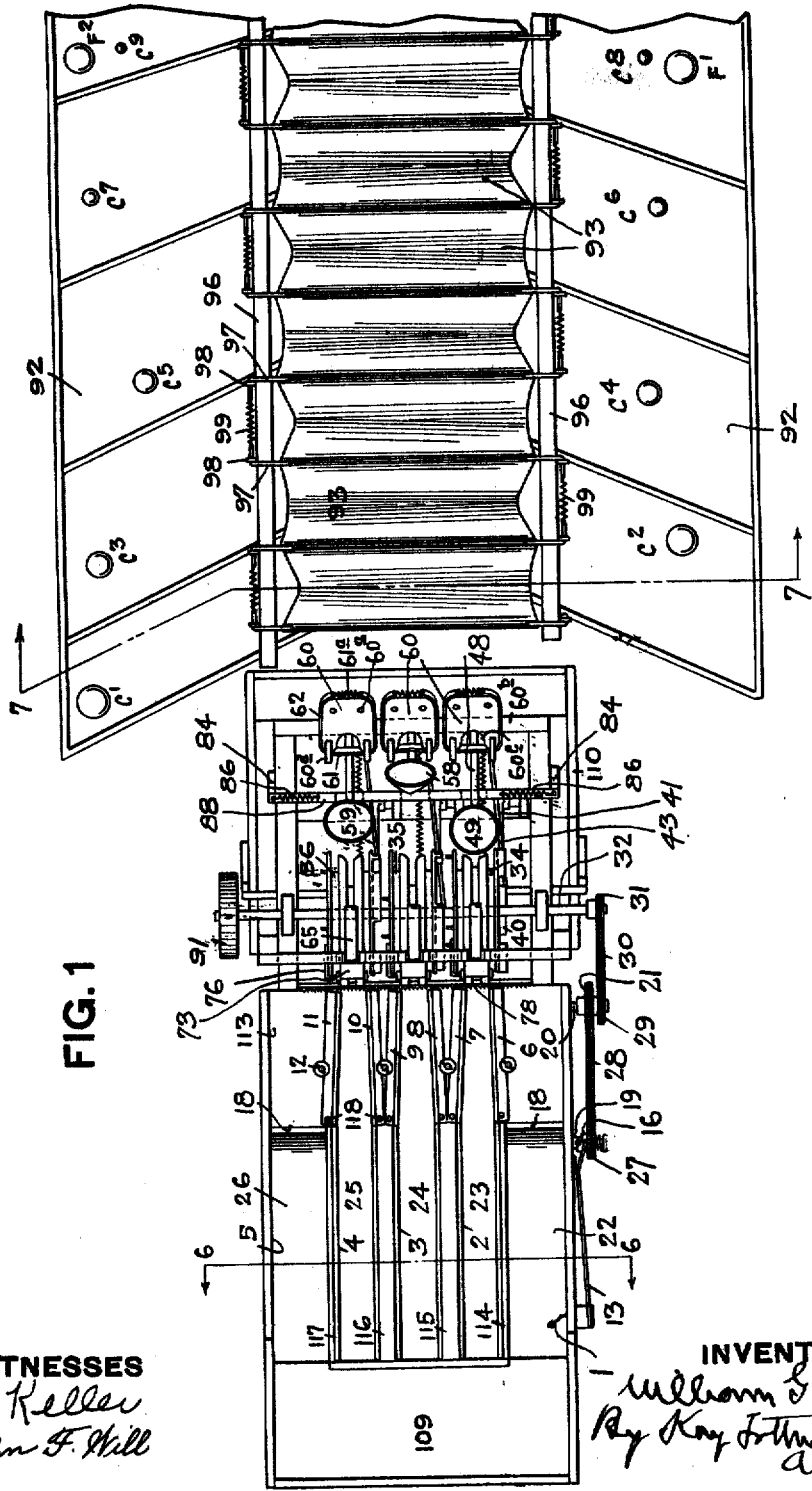

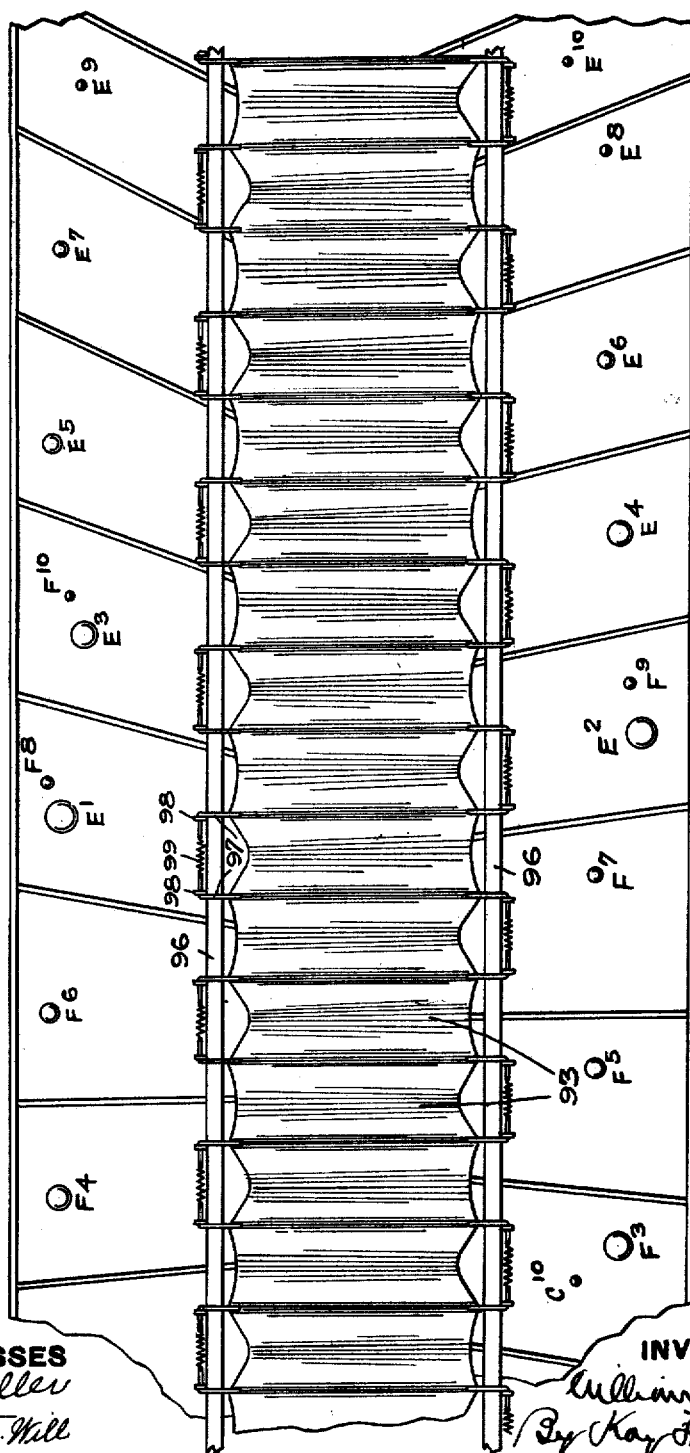

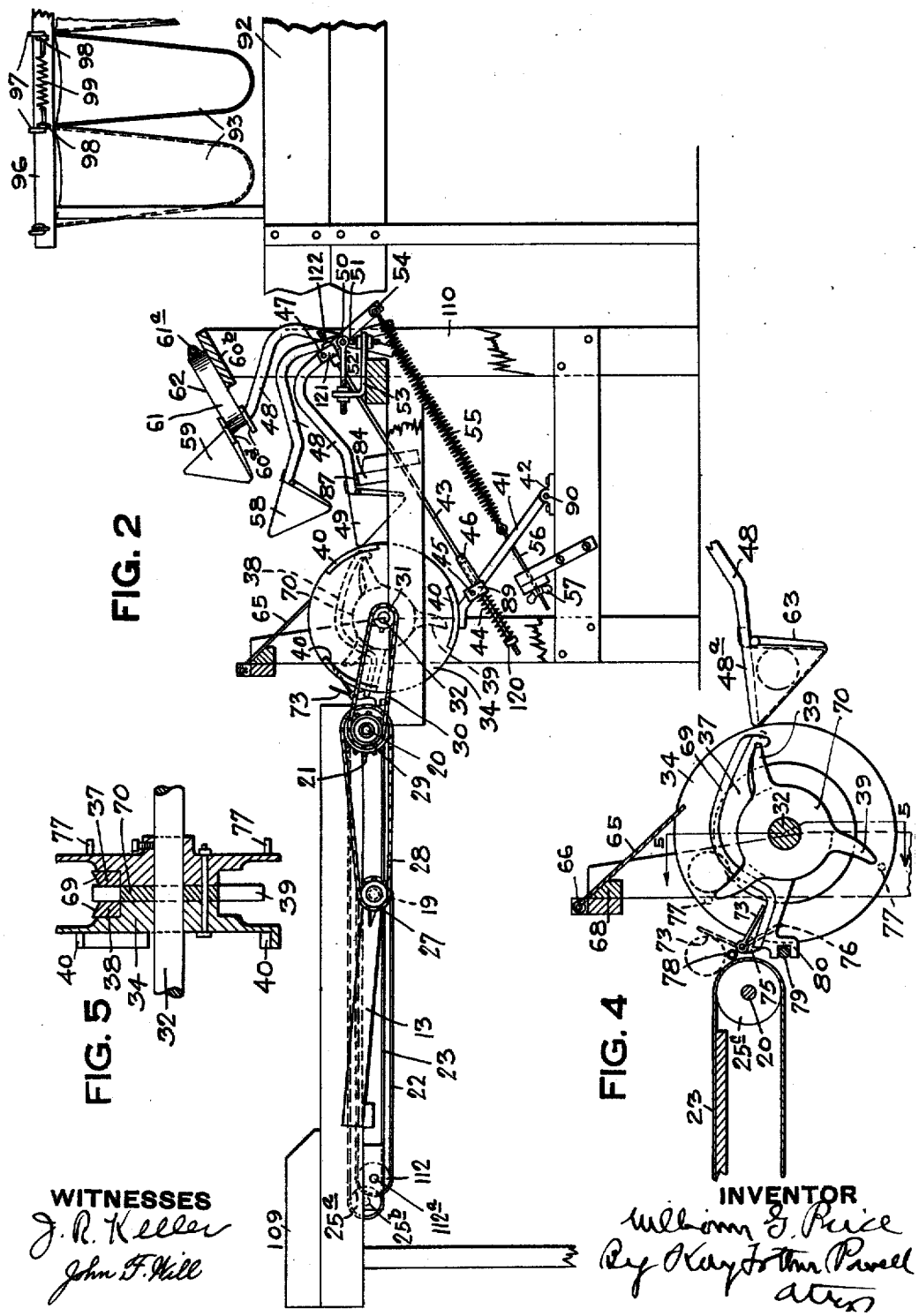

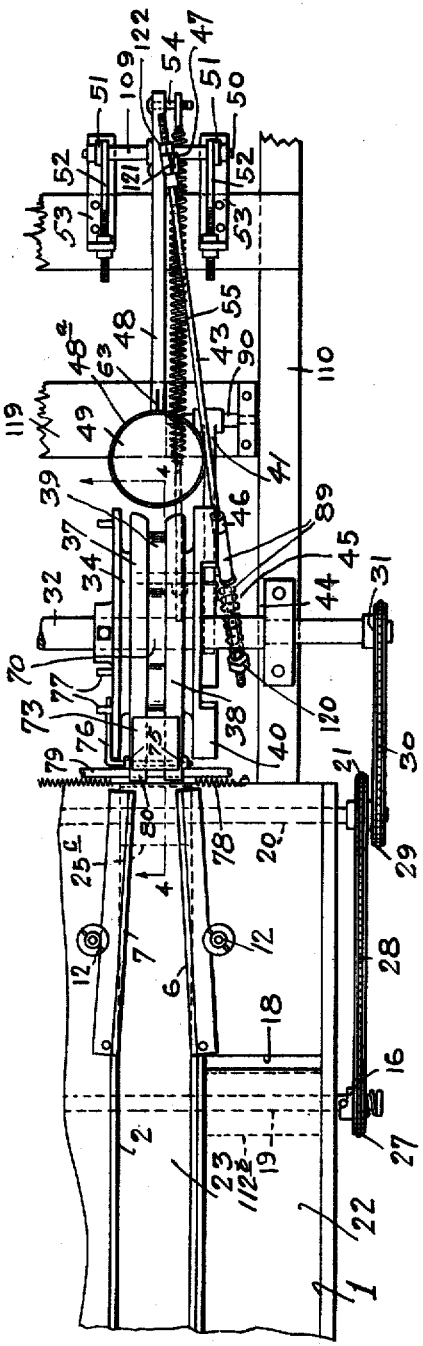
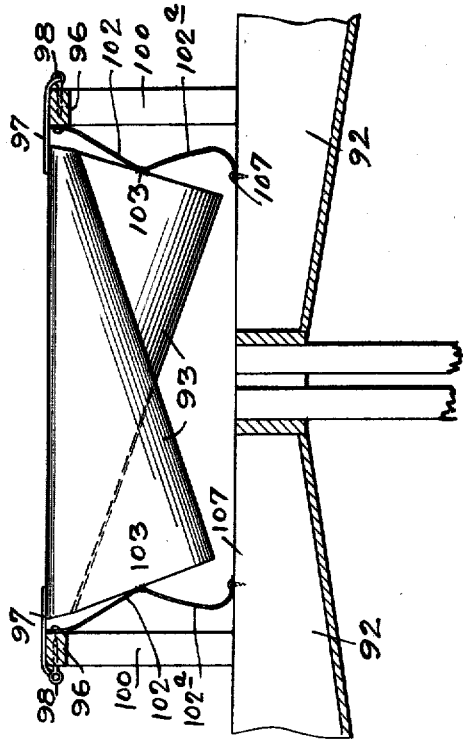
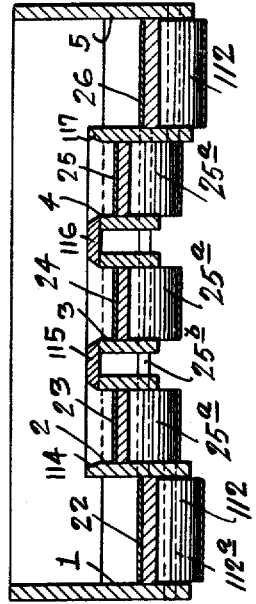

WILLIAM G. PRICE, OF NORTH YAKIMA, WASHINGTON.

SIZING-MACHINE.

1,325,909.                    Specification of Letters Patent.        Patented Dec. 23, 1919.

Application filed April 26, 1916. Serial No. 93,783.

*To all whom it may concern:*

Be it known that I, WILLIAM G. PRICE, a citizen of the United States, and resident of North Yakima, in the county of Yakima and State of Washington, have invented a new and useful Improvement in Sizing-Machines; and I do hereby declare the following to be a full, clear, and exact description thereof.

My invention relates to apparatus for sizing apples, fruits, vegetables or other articles.

The apparatus of the present invention involves the same principle as the apparatus which forms the subject-matter of an application for Letters Patent of the United States filed by me October 10, 1913, Serial No. 794,476, in that the articles are thrown varying distances according to weight—articles of different weight being thrown different distances and collected in different bins or receptacles.

To meet the demands of the fruit industry, it is necessary to sort the apples, for instance, into three grades and divide each grade into a number of different sizes, so that the object of my present invention is to meet this demand and provide for the sorting of the apples by hand and the sizing by the machine itself.

In the accompanying drawings, Figures 1 and 1ª show a plan view of my improved apparatus, said figure extending over two sheets of the drawings due to the inability to illustrate it on one sheet; Fig. 2 is a side elevation of my improved apparatus showing only a portion of the receptacles or receiving-bins; Fig. 3 is a plan view of a portion of the machine without the receptacles or bins; Fig. 4 is an enlarged side elevation, partly in section, of one of the distributing wheels; Fig. 5 is a cross-section on the line 5—5, Fig. 4; Fig. 6 is a section on the line 6—6, Fig. 1; and Fig. 7 is a section on the line 7—7, Fig. 1.

Referring to the drawing, the numeral 109 indicates a receiving box for the apples or other articles onto which they are discharged. The sorting-belts 22 and 26 extend under the box 109 and pass down runways 1 and 5, as indicated in Fig. 6. These sorting-belts are carried on pulleys 112 at their rear ends and at their forward ends on like pulleys 112ᵇ on shaft 19.

At the forward ends of the sorting-belts 22 and 26 are the openings 18 to permit the leaves or other foreign substance to pass through.

The floor 113 is higher than the runways 1 and 5 so that the fruit cannot pass beyond the openings 18.

The movement of the belts 22 and 26 is controlled by the lever 13, which acts on a suitable clutch 16 connecting the sprocket-wheel 27 to the shaft 19.

Feeding-belts 23, 24 and 25 extend under the box 109 and pass down the runways 2, 3 and 4. These belts are carried on suitable pulleys 25ª, which are located on short shafts 25ᵇ between and higher than the short shafts 112ª, which carry the pulleys 112. The belts 23, 24 and 25 are also carried at their forward ends on suitable pulleys 25ᶜ mounted on the shaft 20. The belts 23, 24 and 25 are higher than belts 22 and 26 and are separated from them and from each other by partitions 114, 115 and 116 and 117. These partitions have the movable portions 6, 7, 8, 9, 10 and 11 at the discharge ends of the feeding-belts, said partitions being mounted on pivots 118, and said partitions may be adjusted in any desired position by means of the wing-nuts 12.

The feeding-belts 23, 24 and 25 are mounted on suitable pulleys on the shaft 20, which carries the sprocket-wheel 29 driven by the sprocket-belt 30, which is carried on the sprocket-wheel 31, which in turn is attached to the shaft 32, which carries the pulley 91 driven by any suitable power.

In order to drive the sorting belts 22 and 26, the shaft 19 has the sprocket-wheel 27, which is engaged by the sprocket belt 28 connected up to the sprocket-wheel 21. The sprocket-wheel 27 is smaller than sprocket-wheel 21, which causes the sorting-belts to move faster than the feeding-belts.

The shaft 32 is carried in the frame 110 and said shaft carries the cam-wheels 34, 35 and 36, which are keyed to the shaft 32. These wheels are provided with the cams 40 and the pins 77. Attached to the wheels 34, 35 and 36 are the lug-wheels 70 provided with the lugs 39. The wheels 34, 35 and 36 each support two rails 37 and 38 which are hinged by a jaw 80 to a cross rod 90 of the machine and are provided with beveled surfaces 69 to form a guide for the fruit in its passage to the receiving-cup hereinafter referred to.

Journaled in the lugs 75 is a plate divider 73 to which is attached a lever-arm

76. The lever-arm 76 is in the path of rotation of the pins 77 on the cam-wheels so that when said wheels revolve said pins engage the levers 76 and lift the dividers up into position indicated in dotted lines, Fig. 4, and hold back the fruit.

Spaced between the dividers 73 and the feeding-belts 23, 24 and 25 is a flexible helical spring 78 which forms a bridge or support for the fruit when it is passing from the belt to the divider, as indicated in Fig. 4. This spring extends across the machine and past the three feeding-belts.

The cam-levers 41 are provided with bearings 90, which engage the journal 42 in the bracket 119. The free ends of the levers 41 are engaged by the cams 40 and are depressed as the cam-wheels revolve.

The cam-rods 43 are provided with the pin-bearing 89, which is free to slide on said rods. A stop or abutment 46 is provided on the cam-rod 43, and a spring 44 is interposed between the pin-bearing 89 and the nut 120 at the lower end of said cam-rod. The bearing 89 engages the pin 45, which moves the rod 43 longitudinally when the cam-lever 41 is moved by the cam 40. The other end of the cam-rod 43 is connected to the cup-arm 48 through the bearing-pin 47 and the piece 121, which is adjusted by the nut 122.

The cup-arm 48 is provided with the cross-arm 109 through which passes the bearing-pin 50. The pin 50 is supported by adjustable bolts 51 and 52, which are carried by brackets 53 secured to the frame 110. The cup-arm 48 carries the bearing-pin 54 to which is attached the helical spring 55 adjustable in length by the bolts 56 and wing-nut 57, which engage the frame 110.

The cups 49, 58 and 59 are made of flexible material, which is sewed to a ring-portion 48ª formed on the end of the arm 48. The apex of the cup is sewed to the end of a spring-wire 63 attached to the arm 48. The spring 63 acts to hold the apex of the cup down so as to preserve its conical shape when receiving the fruit. Buffers 62 are provided to limit the upward swing of the cups. These buffers comprise plates 60 secured by screws 60ª to the inclined cross-piece 60ᵇ secured to the frame 110. A band 61 of suitable material extends around the plate 60, said band being connected at the rear by the spring 61ª, which is sufficiently strong to hold the band 61 normally taut. The plate 60 is provided with the recessed portion 60ᶜ at its front end, and it is also provided with the projecting fingers 60ᵈ, which act to hold the band 61 in position and prevent its slipping from the plate 60. It will be apparent from the above that when one of the cup-arms is released and is carried forward by the spring, the arm will engage the band 61 and said band will give enough to relieve the jar and strain.

Buffers 88 are also provided to reduce the jar on the cup-arms when they are drawn down in position to receive the apple, said buffer comprising a band 87, which is connected at its ends by springs 86 to uprights 84.

Swinging plates 65 are pivoted to the frame 110 at 66 and their downward movement is limited by the stop 68. These plates act to hold the fruit on the rails 37—38 when the fruit is being moved by the lugs 39 over in position to be discharged into the cups.

The troughs 93 have inclined bottoms and are open at one end alternately to permit the fruit to roll out into bins on each side of the troughs. The troughs are made tapering in form, and the larger ends of the troughs are supported by sheets of canvas 102, which are rigidly fastened to bag-rails 96 supported by posts 100 secured to the bins 92. The canvas 102 is sewed to the two sides of the open end of the troughs at 103 and acts to support the trough vertically to prevent it from swinging horizontally. The bottom end of the canvas 102 is secured to the bin-partitions 107 and curves back above the partitions as at 102ª to form a buffer in the path of the fruit moving out of the trough and from which the fruit falls into the bins 92.

The complete set of troughs 93 is preferably formed of one piece of cloth folded without seams. The top edges or folds of the troughs are supported by straps 97, which pass over the trough-rails 96 and through screw-eyes 98, said troughs being connected in pairs by helical springs 99. The straps 97 thus have frictional contact with the rails 96 and the screw-eyes 98, which retard their movement when acted upon by the force of an apple striking the trough, which pulls on the strap and lengthens the spring and which in turn by the recoil of the spring pulls the strap back into its normal position. This retarded or slow return of the strap 97 prevents the edge of the trough from swinging back quick enough to throw the apple into the next trough before it falls to the bottom of the trough, which it is liable to do if the troughs are spring-supported with no friction device retarding the recoil movement of them. The supporting of the troughs by the rigid canvas 102 greatly reduces the strain that would otherwise be put upon the straps 97 and springs 99 so that the springs 99 are made comparatively weak and thus have much less power to recoil and throw the apple into another trough, which would make the sizing inaccurate. The cup-arm adjusting bolts 51 and 52 permit the cup and arm to be adjusted in position in three directions—viz., toward the wheel 34 by changing the length of both of the bolts 52 equally; transversely of the wheel 34 by making one bolt longer than the other; and lastly, the cup and arm can be rotated by making one bolt 51 longer than the other, which will lift up one end of the cross-arm 109. The first two adjustments, and the last adjustment is required to make the cup throw the fruit to the center of the line of troughs.

The spring 44 on the rod 43 acts to prevent the connecting parts from being broken by an apple catching or stopping between the front rim of the cup 59 and the wheel 34, which would prevent the cup from moving down to its normal position for receiving the fruit. The resulting strain is relieved by the bearing-piece 89 slipping away from the stop 46 and compressing the spring 44, thus increasing the distance between the pins 45 and 47 and permitting the lever 41 to be further depressed by putting slight additional strain on the parts.

It is very essential that the pieces of fruit reach the cup and fall into it one by one and in unison with the movement of the cup. To secure this result, I have provided the adjustable runway side-pieces 6, 7, 8, 9, 10 and 11, which can be adjusted to suit the average size of the fruit, some large varieties of apples require a wider runway than small peaches.

In operation, the fruit to be sized is dumped into the box 109 and is rolled into the runways 1 and 5 to be carried along by the bolts 22 and 26. The sorters standing at opposite sides of the machine pick the fruit out of the runways 1 and 5 and place it in the runways 2, 3 and 4 according to grade. Usually the "C" grade is placed in runway 4; the fancy in runway 2; and the extra fancy in runway 3. The bolts 23, 24 and 25 carry the fruit to the divider-plates 73 where the fruit is picked up by the lugs 39 and carried along the rails 37 to be discharged into the cup in position to receive the fruit. After the fruit has been deposited in the cup, the cam-wheels 34 are so timed as to release the proper lever 41, and the spring 55 is then permitted to act on the cup-arm so as to throw the fruit from the cup. The fruit is thrown a distance corresponding to its weight and drops into its proper trough 93 whence it passes from the open end of said trough into the proper bin, the canvas 102 forming a buffer in the path of the fruit passing from the trough to the bin.

Each pin 77 acts to lift the divider and hold back the fruit. When the lug 39 has passed up a short distance, as in Fig. 4, the arm 76 escapes from the pin 77 and the divider 73 drops down into position for permitting another piece of fruit to roll in under the lug 39 in position for the next lug to lift it and roll it along the buffer-rails 37 until it rolls into the cup, which has come down at that particular instant to receive it.

It is very essential that the machine take up as little space as possible, and in order to reduce the space required to a minimum, I have preferably constructed my machine to throw all three grades of fruit into one set of bins. I have made the spring 55, which swings cup 59, weak so it tosses the "C" grade fruit into the ten troughs nearest to the cup. I adjust the spring which swings the cup so that this cup tosses the fancy grade fruit into ten troughs farther away from the cup, and I adjust the spring which swings cup 58 so that it tosses the extra fancy grade fruit into ten troughs farthest away from the cup. From these troughs the fruit rolls out into the bins. The action of the cup is to throw the fruit a distance in proportion to its weight. The circles marked "C", "F", and "E" represent "C" fancy and extra fancy grades, and the size of the circles indicate the size of the apples of a grade in a bin. The grades are in the bins marked "C—1" to "C—10"; "F—1" to "F—10"; "E—1" to "—10". These grades overlap or mix in one or more bins, and the bins where there are two grades in one bin, one grade is very small fruit and the other grade is very large fruit, as is the case where "F—2" and "C—9" are in the same bin. This mixing of the grades, which may be more than two bins, greatly reduces the space required for bins by reducing their number. Where there are two sizes of apples in the same bin, one size is all one grade and the other size another grade, which enables the packers to pick them out without difficulty and place each grade in boxes by themselves.

By reducing the number of bins in this way the distance and height that the fruit is tossed is greatly reduced, which reduces the strain on the machine and permits the machine to be operated in a warehouse with a low ceiling.

Where only one grade of fruit is required, the cups are operated with springs of different strength and then the one grade is distributed to three localities in the bins, the same as the three grades, which gives a wider distribution and room for more packers to be employed. The same applies where two cups are employed.

What I claim is:

1. In a machine for sizing articles, the combination with a suitable frame, of receptacles for the articles, and means for automatically delivering two or more grades of different sized articles to one of said receptacles.

2. In a machine for sizing articles, the combination with a suitable frame, of receptacles for the articles, and throwing means for delivering two or more grades of different sized articles to one of said receptacles.

3. In a machine for sizing articles, the combination with a suitable frame, of a spring-actuated cup, means for delivering the article to said cup, a rotary cam, a lever in the path of said cam, and yielding connections between said lever and said cup for retracting same.

4. In a machine for sizing articles, the combination with a suitable frame, of a spring-actuated cup, means for delivering the articles to said cup, a rotary cam, a cup-arm, a lever adapted to be engaged by said cam, a rod connected to the cup-arm, and flexible connections between said rod and said lever.

5. In a machine for sizing articles, the combination with a suitable frame, of a spring-actuated cup-means for delivering the articles to said cup, a rotary cam, a cup-arm, a lever adapted to be engaged by said cam, a rod connected to the cam-arm, and slidable connections between said rod and said lever.

6. In a machine for sizing articles, the combination with a suitable frame, of a spring-actuated cup, means for delivering the articles to said cup, a cup-arm, a rotary cam, a lever in the path of said cam, a rod connected to the cam-arm, slidable connections between said rod and said lever, and a spring on said rod adapted to relieve the strain on said rod.

7. In a machine for sizing articles, the combination with a suitable frame, of a spring-actuated cup, means for delivering the article to said cup, a cup-arm, a rotary cam, a lever in the path of said cam, a rod connected to said cup-arm, connections between said lever and said rod, and a spring on said rod interposed between said sleeve and an abutment on said rod.

8. In a machine for sizing articles, the combination with a suitable frame, of a spring-actuated cup, means for delivering the article to said cup, a cup-arm, a rotary cam, a lever in the path of said cam, a rod, abutments on said rod, a slidable sleeve engaging one of said abutments, connections between said lever and said rod, and a spring on said rod interposed between said slidable sleeve and the other abutment.

9. In a machine for sizing articles, the combination with a suitable frame, of a spring-actuated throwing cup, means for releasing and retracting said cup, a runway for guiding the article into the cup comprising a pair of rails adapted to receive and hold the article against gravity movement into the cup, means for delivering the articles one by one onto said rails, and means for moving the article along said rails to said cup.

10. In a machine for sizing articles, the combination with a suitable frame, of a spring-actuated throwing cup, means for releasing and retracting same, a runway for guiding the article into the cup comprising a pair of spaced rails depressed for a portion of their length to form a pocket to prevent gravity feed of the article into the pocket, means for delivering the articles one by one to said runway, and a rotary member having projections adapted to engage the article and move it on said rails to said cup.

11. In a machine for sizing articles, the combination with a suitable frame, of a spring-actuated throwing cup, means for releasing and retracting said cup, a runway for guiding the article into the cup comprising a pair of rails having beveled traction surface for centering the article between the rails, and having a seat for retarding gravity movement of the article, means for delivering the articles one by one onto said rails, a rotary member having a projection adapted to engage the article between the rails and deliver same to said cup.

12. In a machine for sizing articles, the combination with a suitable frame, of a spring-actuated throwing cup, means for releasing and retracting same, a rotary member, a stationary runway in said rotary member adapted for holding the article against gravity feed to said cup, means for delivering the articles one by one to said runway, a projection on said rotary member adapted to engage the article and move the same over said runway to said cup, and means for holding the succeeding article back while said projection is advancing an article to said cup.

13. In a machine for sizing articles, the combination with a suitable frame, of a spring-actuated throwing cup, means for releasing and retracting same, a rotary member, a stationary runway in said rotary member adapted for holding the article against gravity movements to said cup, means for delivering the articles one by one to said runway, a projection on said rotary member adapted to engage the article and move the same over said runway to said cup, and means for holding the succeeding article back while said projection is advancing an article to said cup.

14. In a machine for sizing articles, the combination with a suitable frame, of a spring-actuated throwing-cup, means for releasing and retracting same, a rotary member, a stationary runway on said rotary member, means for delivering the article to said runway, a projection carried by said rotary member adapted to engage the article in said runway and convey it to said cup, and a divider-plate operated by the movement of said rotary member to hold back the succeeding article when said projection is advancing an article to said cup.

15. In a machine for sizing articles, the combination with a suitable frame, of a spring-actuated throwing cup, means for releasing and retracting same, a rotary member, a stationary runway on said rotary member, means for feeding the article to said runway, a projection on said rotary member adapted to engage said article in said runway to deliver it into said cup, a swinging divider-plate, an arm connected to said divider-plate, and a projection on said rotary member adapted to engage said arm.

16. In a machine for sizing articles, the combination with a suitable frame, of a traveling feeding device, a pick-up device, and a yielding support in the space between said feeding device and said pick-up device.

17. In a machine for sizing articles the combination with a suitable frame, of a traveling feeding device, a pick-up device, and a helical spring bridging the space between the said feeding device and said pick-up device.

18. In a machine for sizing articles, the combination with a suitable frame, of a runway, an endless traveling grading belt in said runway, a second runway, an endless traveling feed belt parallel with said grading belt in said second runway, and adjustable side portions at the forward ends of said second runway.

19. In a machine for sizing articles, the combination with a suitable frame, of a runway, an endless traveling grading belt in said runway, a second runway, an endless traveling feed belt parallel with said grading belt in said second runway, and pivotally mounted adjustable side portions at the forward ends of said second runway.

In testimony whereof I, the said WILLIAM G. PRICE, have hereunto set my hand.

WILLIAM G. PRICE.

Witnesses:
CARRIE GROSENBAUGH,
HARRY LINSE.